(12) United States Patent
Forte et al.

(10) Patent No.: US 12,712,444 B2
(45) Date of Patent: Aug. 18, 2026

(54) POWER FACTOR CORRECTION DEVICE AND APPARATUS FOR CONVERTING A THREE-PHASE ALTERNATING CURRENT INTO A DIRECT CURRENT

(71) Applicants: ELDOR CORPORATION S.P.A., Orsenigo (IT); DR. ING. H.C. F. PORSCHE AG, Stuttgart (DE)

(72) Inventors: Pasquale Forte, Orsenigo (IT); Alessandro Poli, Orsenigo (IT)

(73) Assignee: BORGWARNER ORSENIGO S.R.L., Orsenigo (IT)

( * ) Notice: Subject to any disclaimer, the term of this patent is extended or adjusted under 35 U.S.C. 154(b) by 98 days.

(21) Appl. No.: 18/263,844

(22) PCT Filed: Jan. 31, 2022

(86) PCT No.: PCT/IB2022/050810
§ 371 (c)(1),
(2) Date: Aug. 1, 2023

(87) PCT Pub. No.: WO2022/167911
PCT Pub. Date: Aug. 11, 2022

(65) Prior Publication Data
US 2024/0120832 A1 Apr. 11, 2024

(30) Foreign Application Priority Data
Feb. 2, 2021 (IT) ........................ 102021000002243

(51) Int. Cl.
*H02J 7/34* (2006.01)
*H02J 7/50* (2026.01)
(Continued)

(52) U.S. Cl.
CPC ........... *H02M 1/4233* (2013.01); *H02J 7/345* (2013.01); *H02J 7/50* (2026.01); *H02M 1/12* (2013.01); *H02J 2207/50* (2020.01); *H02M 7/04* (2013.01)

(58) Field of Classification Search
CPC .. H02M 1/4233; H02M 1/425; H02M 1/4258; H02M 1/4283; H02M 1/12;
(Continued)

(56) References Cited

U.S. PATENT DOCUMENTS

| | | | | |
|---|---|---|---|---|
| 10,784,678 | B1 * | 9/2020 | Xiong | H03H 7/427 |
| 2009/0059625 | A1 * | 3/2009 | Viitanen | H02M 7/48 363/36 |

(Continued)

FOREIGN PATENT DOCUMENTS

| | | | |
|---|---|---|---|
| CN | 108648899 | A | 10/2018 |

OTHER PUBLICATIONS

International Search Report and Written Opinion dated Mar. 29, 2022 from cunterpart International Patent Applicatio No. PCT/IB2022/050810.

Yungtaek Jang et al:, “A Bridgeless PFC Boost Rectifier With Optimized Magnetic Utilization”, IEEE Transactions on Power Electronics, Institute of Electrical and Electronics Engineers, USA, vol. 24, No. 1, Jan. 1, 2009 (Jan. 1, 2009), pp. 85-93, XP011249758, ISSN: 0885-8993.

(Continued)

*Primary Examiner* — Nguyen Tran
(74) *Attorney, Agent, or Firm* — SHUTTLEWORTH & INGERSOLL, PLC; Timothy J. Klima

(57) ABSTRACT

A power factor correction device includes a power supply side which can be connected to an alternating current source, an output side which can be connected to a direct current load, at least a first power inductor electrically connected in series to a first terminal of the power supply side, and a rectifier operatively interposed between the power supply side and the output side. The rectifier includes a diode bridge configured to convert the alternating current from the source into a direct current towards the load, and one or more
(Continued)

Figure 1:
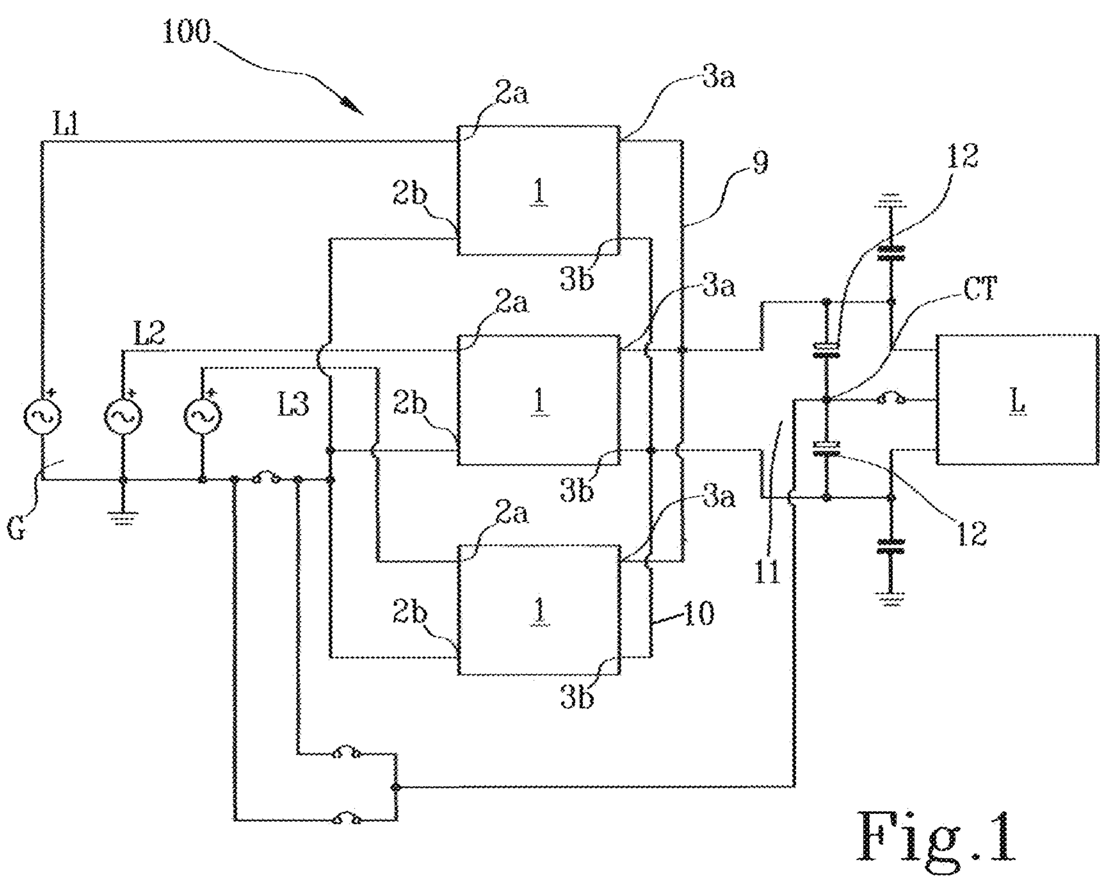

switches which can be selectively switched between an open configuration and a closed configuration in order to switch the rectifier between a first configuration, in which it interrupts the current flow towards the output side and charges the first inductor, and a second configuration, in which it allows the transfer of current to the load and discharges the first inductor. A second power inductor is electrically connected in series to a second terminal of the power supply side.

7 Claims, 3 Drawing Sheets

(51) Int. Cl.
*H02M 1/12* (2006.01)
*H02M 1/42* (2007.01)
*H02M 7/04* (2006.01)

(58) Field of Classification Search
CPC ............ H02M 1/14; H02M 1/15; H02M 7/04; H02M 7/08; H02M 7/10; H02M 7/12; H02M 7/155; H02M 7/162; H02J 7/0013; H02J 7/345
See application file for complete search history.

(56) References Cited

U.S. PATENT DOCUMENTS

| | | | | |
|---|---|---|---|---|
| 2009/0059685 | A1 | 3/2009 | Houston | |
| 2009/0303762 | A1* | 12/2009 | Jang | H02M 1/4208 363/61 |
| 2012/0257427 | A1* | 10/2012 | Fattal | H02M 7/219 363/84 |
| 2014/0313795 | A1 | 10/2014 | Mi | |
| 2015/0162822 | A1* | 6/2015 | Ho | H02M 1/4225 363/89 |

OTHER PUBLICATIONS

Ide P et al: “Active Common-Mode Voltage Cancellation for Three-Phase Pwm Rectifier/Inverter Systems Based on a New Topology”, Apec 2001. 16th. Annual IEEE Applied Power Electronics Conference and Exposition. Anaheim, CA, Mar. 4-8, 2001; [Annual Applied Power Electronics Conference], New York, NY : IEEE, US, vol. Conf. 16, Mar. 4, 2001 (Mar. 4, 2001), pp. 201-207, XP001049728, DOI: 10.1109/APEC.2001.911648 ISBN: 978-0-7803-6618-3.

International search reported dated Sep. 22, 2025 from application No. 22 705 474.9.

* cited by examiner 3a
5
1
7
4
2a

N
8
2b
6
3b 3a
1
5
7
4'
4
2a
8'
N
8
2b 6
3b 1
5
24
3a
21a
21
22
22a
7
7
23b
23b
4
22b
2b
21a
2a
8
22a
23a
23a
7
7
23
23
21b
25
3b
6

5
3a
4
7
7
2a 8
2b
7
6
3b
7

5
3a
1
4
4'
7
7
8'
2a 8
2b
7
6
3b
7

1
5
4
7
11
12
8
3
2
CT
L1
L
12
N
6

POWER FACTOR CORRECTION DEVICE AND APPARATUS FOR CONVERTING A THREE-PHASE ALTERNATING CURRENT INTO A DIRECT CURRENT

This application is the National Phase of International Application PCT/IB2022/050810 filed Jan. 31, 2022 which designated the U.S.

This application claims priority to Italian Patent Application No. 102021000002243 filed Feb. 2, 2021, which applications are incorporated by reference herein.

The present invention relates to a power factor correction device and an apparatus for converting a three-phase alternating current into a direct current.

Therefore, the present invention finds its main application in the automotive field, in particular in the design and construction of charging systems for on-board electric batteries.

In the case of electric vehicles, in fact, the battery pack charging mode is divided into two distinct respective macro-categories: on-board chargers and ground chargers.

The “on-board chargers”, as the name suggests, are built into the vehicle and include all the power and control electronics needed to convert the alternating current from the grid into direct current required to recharge the battery pack.

On the other hand, the “ground” chargers are the usual “columns” or wallboxes which operate the conversion directly, supplying direct current to the vehicle.

It therefore appears that battery chargers of the on-board type, since they have to manage an alternating current coming from the grid and convert it into direct current for recharging high-voltage batteries, show greater criticality both from the user’s safety point of view and in terms of managing the power supply irregularities coming from the grid.

This is even more crucial in the construction of on-board charging systems of the non-insulated type, in which the battery charger has a direct electrical connection for the outlet of the alternating current wiring, which particularly suffer from irregularities in the power supply, with voltage floating problems and consequent earth leakage current criticality.

In particular, in the AC/DC conversion stage, i.e., in the rectifier, the on-board charging systems, although equipped with suitable power factor correction systems, struggle to compensate in an optimal way the discontinuities of the current coming from the grid, which also result in significant ripple downstream of the rectification.

Moreover, if the neutral is not connected to the central tap of the capacitor bank, a floating voltage is generated (voltage floating effect) between the positive voltage terminal of the DC link and the earth, as well as between the negative voltage terminal of the DC link and the earth, mainly due to the rectifier diodes present in the power factor correction structures and to the neutral earth connection in the medium and low-voltage grid substations. Furthermore, considering that between positive and earth (and between negative and earth) there are high-capacitance capacitors Y used to reduce electromagnetic emissions, the voltage floating at their terminals is transformed into earth current injection according to the following law, negatively affecting the safety of the system (especially if of the non-insulated type).

Therefore, it is an object of the present invention to provide a power factor correction device and an apparatus for converting a three-phase alternating current into a direct current, which can overcome the above-mentioned drawbacks of the prior art.

In particular, it is an object of the present invention to provide a power factor correction device and an apparatus for converting a three-phase alternating current into a direct current, which are structurally simple and at the same time capable of significantly reducing the voltage floating and ripple following rectification.

Said objects are achieved by means of a power factor correction device and an apparatus for converting a three-phase alternating current into a direct current, having the features listed in one or more of the following claims.

In particular, the power factor correction device comprises a power supply side which can be connected to an alternating current source.

The power supply side is provided with at least a first terminal and a second terminal, which can be connected to a phase and to the neutral of said source, respectively.

There is also an output side which can be connected to a (direct current) load and is provided with a positive voltage terminal and a negative voltage terminal.

A first power inductor is electrically connected in series to said first terminal of the power supply side, i.e., it is operatively arranged downstream of the first terminal.

A rectifier is operatively interposed between the power supply side and the output side.

The first inductor is therefore interposed between the first terminal and the rectifier.

The rectifier comprises a diode bridge configured to convert the alternating current from the source into a direct current towards the load, and one or more switches which can be selectively switched between an open configuration and a closed configuration.

Preferably, therefore, said one or more switches are configured to switch the rectifier between a first configuration and a second configuration.

In the first configuration, the rectifier interrupts the current flow towards the output side and charges said first inductor.

In the second configuration, the rectifier allows the transfer of current to the load and discharges said first inductor.

According to one aspect of the invention, the device comprises a second power inductor electrically connected in series to said second terminal of the power supply side.

Advantageously, the presence of the second inductor “on the neutral” prevents direct connection of the neutral to the load power supply branches, damping the oscillations and significantly reducing current ripple.

A further object of the present invention is an apparatus for converting a three-phase alternating current into a direct current (preferably, but not necessarily, used inside a charging device).

The apparatus comprises three power factor correction devices as described heretofore.

These devices have the first terminals of the power supply side each connected to a respective phase of a three-phase alternating current source.

The second terminals of the power supply side are connected in parallel with each other to the neutral of the three-phase alternating current source.

On the other hand, the positive voltage terminals of the output side are connected in parallel with each other to a positive voltage branch, whereas the negative voltage terminals of the output side are connected in parallel with each other to a negative voltage branch.

Preferably, the apparatus further comprises a charging stage operatively arranged downstream of said three devices and connected to said positive and negative voltage branches.

The charging stage preferably comprises a capacitor bank configured to be charged when said rectifier is in said second configuration.

According to one (optional) aspect of the invention, the capacitor bank has at least two capacitors connected in series and between which a central tap is interposed.

The second terminals of the power supply side of the devices are connected to the central tap of the capacitor bank, so as to maximize the efficiency of the correction devices by providing one inductor for each capacitor, thus charging them not alternately but simultaneously and consequently causing a substantial reduction in the ripple.

The dependent claims, hereby incorporated by reference, correspond to different embodiments of the invention.

Figure 2:
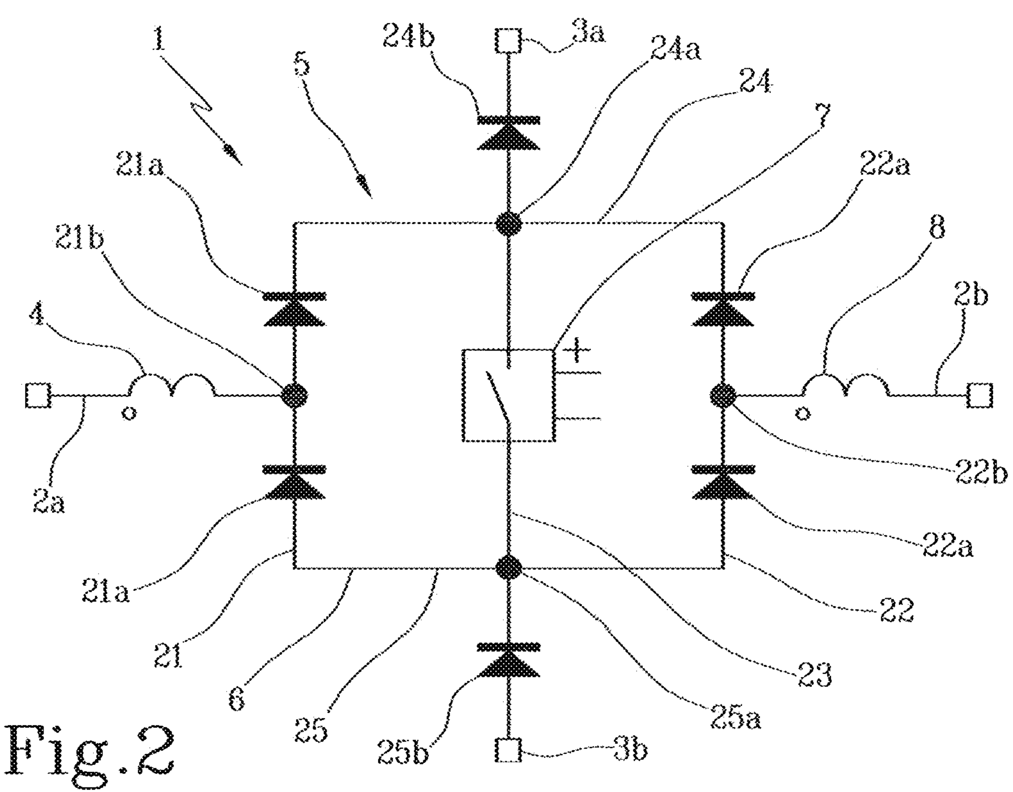
Figure 8:
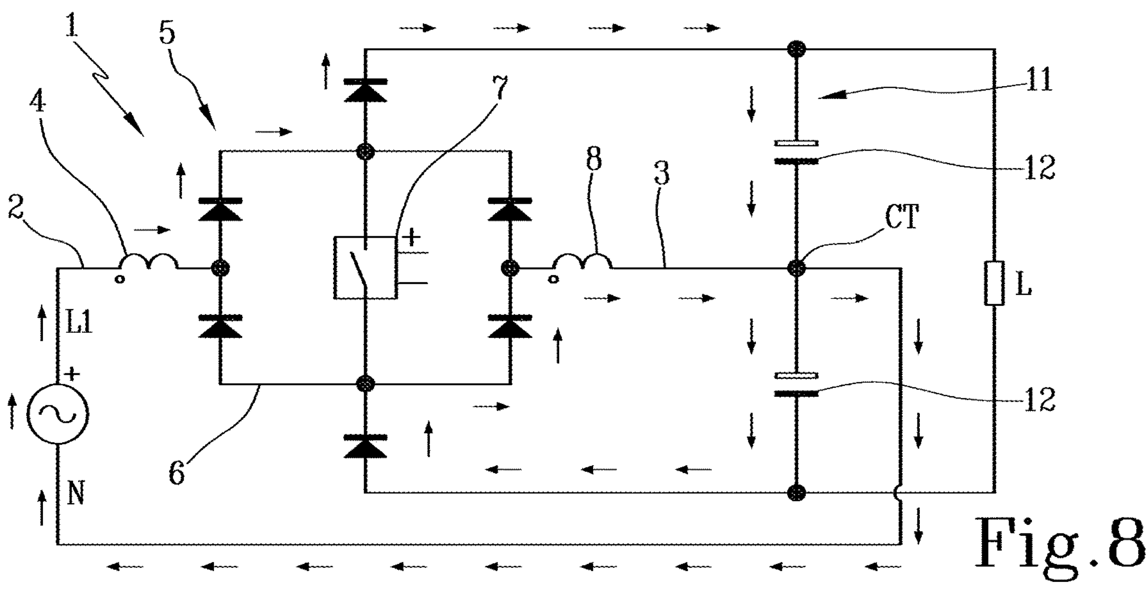

Further features and advantages of the present invention will become apparent from the indicative, and therefore non-limiting description of a preferred, but not exclusive, embodiment of a power factor correction device and an apparatus for converting a three-phase alternating current into a direct current, as illustrated in the accompanying drawings wherein:

FIG. 1 schematically shows the structure of an apparatus for converting a three-phase alternating current into a direct current according to the present invention;

FIGS. 2 to 7 schematically show the structure of a power factor correction device according to the present invention, in six different alternative embodiments;

FIG. 8 schematically shows the flow of currents in a configuration of use of the power factor correction device in FIG. 2.

With reference to the accompanying figures, reference numeral 1 generally designates a power factor correction device in accordance with the present invention.

This device 1 is preferably, but not necessarily, inserted into an apparatus 100 for converting a three-phase alternating current into a direct current, more preferably in the AC/DC conversion stage of a charging device.

However, the device 1 could also find application in any system in which it is necessary to convert alternating current (one, two or three-phase) into direct current.

Therefore, in the present specification, for the sake of simplicity of description, reference will be made to the illustrated examples and applications, as said, referred to a three-phase system, but this is by no means to be construed as limiting the application and/or required scope of protection, which is to be regarded as covering other systems and applications, provided that they are compatible with the structure of the power factor correction device of the invention.

Therefore, the device 1 comprises a power supply side 2 which can be connected to an alternating current source G, and an output side 3 which can be connected to a direct current load L.

The power supply side comprises at least a first terminal 2*a* and a second terminal 2*b*, which can be connected to a phase L1, L2, L3 and to the neutral N of the alternating current source G, respectively.

On the other hand, the output side 3 is arranged to be connected to the load L and is provided with a positive voltage terminal 3*a* and a negative voltage terminal 3*b*.

The device 1 further comprises a rectifier 5 operatively interposed between the power supply side 2 and the output side 3.

The rectifier 5 is thus configured to convert the alternating current from the source G into a direct current suitable for powering the load L.

The rectifier 5 can be of various types and constructions, but preferably comprises a diode bridge 6 and one or more switches 7 associated therewith to suitably direct the current flow according to the driving logic and the sign of the power supply current.

In particular, said one or more switches 7 can be selectively switched between an open configuration and a closed configuration in order to switch the rectifier 5 between a first configuration, in which it interrupts the current flow towards the output side, and a second configuration, in which it allows the transfer of current to the load L.

Preferably, said one or more switches are switched at a much higher frequency than the grid frequency (50/60 Hz), thus being able to maximize their effectiveness.

Preferably, the driving frequency is higher than 20 KHz, more preferably higher than 50 KHz.

As mentioned, the configuration of the rectifier can be of various kinds.

Figure 3:
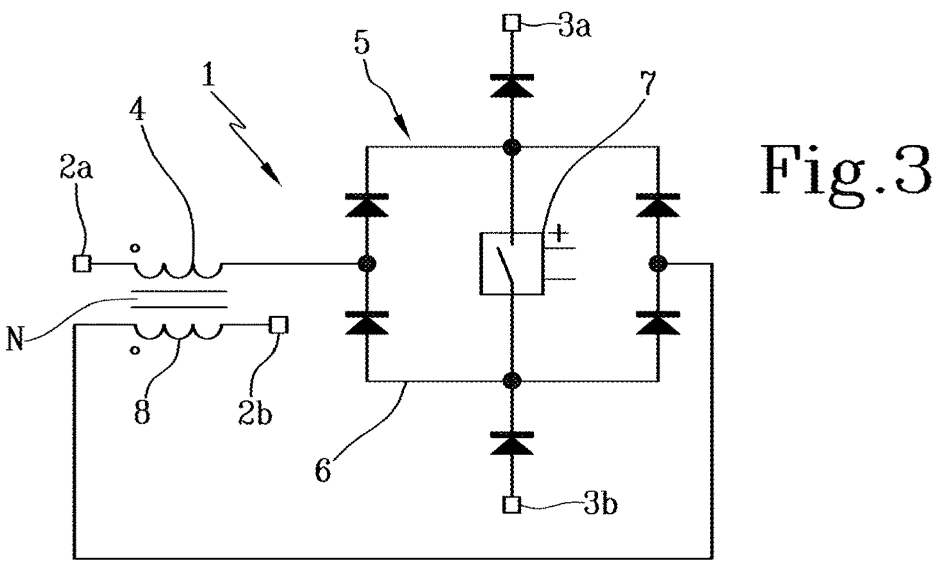
Figure 4:
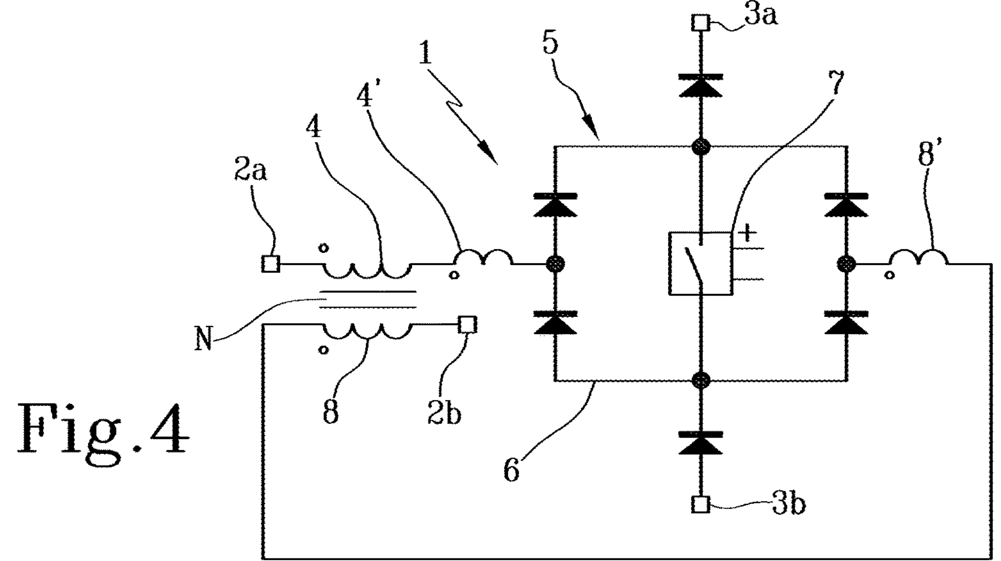

In a first embodiment in accordance with the invention, for example shown in FIGS. 2 to 4, the rectifier 5 has the Vienna topology.

This topology requires the presence of two power supply branches, two output branches, and one control branch.

In particular, a first power supply branch 21 extends between two output branches 24, 25 and comprises two first diodes 21*a* arranged in succession and concordant; a first central node 21*b* is interposed between said first diodes 21*a* and is connected to the first terminal 2*a* of the power supply side 2.

A second power supply branch 22 extends between the two output branches 24, 25 and comprises two second diodes 22*a* arranged in succession and concordant; a second central node 22*b* is interposed between said second diodes 22*a* and is connected to the second terminal 2*b* of the power supply side 2.

As said, the output branches are two, respectively, a first 24 and a second 25 output branch.

The first 21 and the second 22 power supply branches are arranged in parallel between said first 24 and second 25 output branches.

The first output branch 24, in turn, has a third central node 24*a* connected to the positive voltage terminal 3*a* of the output side 3; preferably, a further diode 24*b* is provided between the third central node 24*a* and the positive voltage terminal 3*a* and is configured to allow the flow of current towards the positive voltage terminal 3*a*.

The second output branch 25, in turn, has a fourth central node 25*a* connected to the negative voltage terminal 3*b* of the output side 3; preferably, a further diode 25*b* is provided between the fourth central node 25*a* and the negative voltage terminal 3*b* and is configured to allow the flow of current towards the fourth central node 25*a*.

The control branch 23 is arranged in parallel with the first 21 and second 22 power supply branches, operatively interposed between them, and comprises a switch 7 which can be selectively switched between an open condition and a closed condition.

Figure 5:
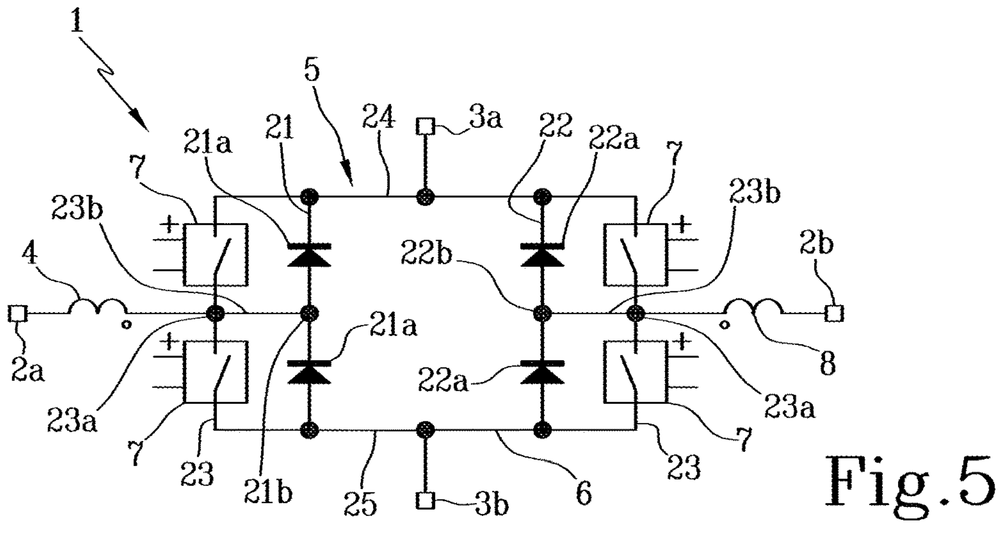
Figure 6:
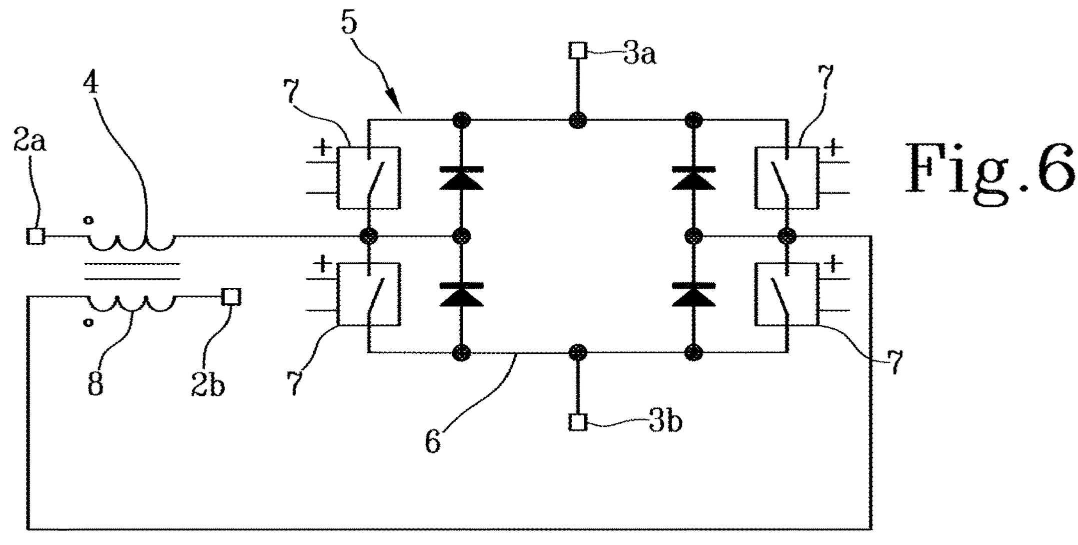
Figure 7:
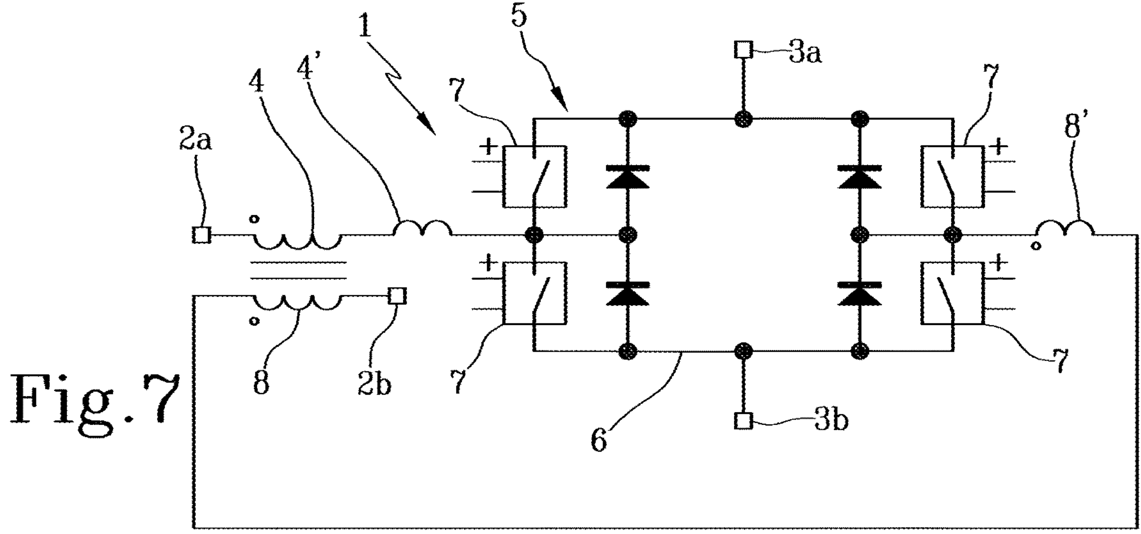

In a second embodiment, for example shown in FIGS. 5 to 7, the rectifier 5 has the Totem pole topology.

This topology differs from the previous one by the presence of two control branches 23, each associated and connected in parallel to a respective power supply branch 21, 22 and provided with:

two switches 7 arranged in series;

a central node 23*a* interposed between the two switches;

a bridge 23*b* connecting the central node 23*a* of the control branch to the central node 21*b*, 22*b* of the respective power supply branch.

This configuration, conceptually similar to the Vienna configuration, has the peculiarity of being bi-directional, as it can transfer energy from the load L towards the source G.

According to the invention, regardless of the topology of the rectifier 5, the device 1 comprises at least a first power inductor 4 electrically connected in series to the first terminal 2*a* of the power supply side 2.

In other words, the first inductor 4 is interposed between the first terminal 2*a* of the power supply side 2 and the rectifier 5, preferably between the first terminal 2*a* of the power supply side 2 and the first central node 21*a* of the first power supply branch 21 of the rectifier 5.

Therefore:

when said one or more switches switch the rectifier 5 into the first configuration, the rectifier 5 charges the first inductor 4, when said one or more switches switch the rectifier 5 into the second configuration, the rectifier discharges the first inductor 4.

According to one aspect of the present invention, the device 1 comprises a second power inductor 8 electrically connected in series to the second terminal 2*b* of the power supply side 2.

Advantageously, this solution allows grid irregularities to be considerably dampened, and the current ripple to be significantly reduced.

In particular, the second power inductor 8 is electrically placed upstream of the second terminal 2*b* of the power supply side 2, preferably interposed between said second terminal 2*b* and the second central node 22*b* of the second power supply branch 22.

With reference to what is shown in FIGS. 3 and 6, the first inductor 4 and the second inductor 8 are preferably magnetically coupled to each other.

In other words, the first inductor 4 and the second inductor 8 are preferably concentrically wound around the same magnetic/ferromagnetic core.

Advantageously, in this way, part of the improvements are obtained by doubling the inductors, but the provision of a single magnetic core positively affects both the size and the cost of the device.

In a further preferred embodiment, shown in FIGS. 4 and 7, the device comprises two first inductors 4, 4' connected together in series and two second inductors 8, 8' connected together in series.

Preferably, one of the first inductors 4 is magnetically coupled to one of the second inductors 8, whereas the remaining inductors are magnetically decoupled from each other.

Advantageously, this structure maximizes the performance relating to the reduction of the leakage current, although it requires three magnetic cores, and hence it requires more space and entails a higher cost.

In a further alternative (not shown), a coupled coil with a strong leakage inductance could be used, so that it behaves like the two inductors in series with the coupled coil but without their actual presence. The optimum of cost, size and performance in reducing the leakage current is thus achieved.

As already discussed above and with reference to the embodiment shown in FIG. 1, the device 1 is preferably inserted into an apparatus 100 for converting a three-phase alternating current into a direct current.

This apparatus is connected between a three-phase alternating current source G equipped with three phase branches L1, L2, L3 and a neutral branch N and a direct current load L.

The apparatus 100 therefore comprises as many power factor correction devices as the source phases.

In the illustrated embodiment, therefore, there are three power correction devices 1.

Each correction device 1 thus comprises the power supply side 2, connected to a phase L1, L2, L3 and to the neutral N of the source G, respectively, and an output side connected to the load L.

In particular, the first terminals 2*a* of the power supply side 2 of the devices 1 are each connected to a respective phase L1, L2, L3 of the three-phase alternating current source G.

The second terminals 2*b* of the power supply side 2 are connected in parallel with each other to the neutral N of the three-phase alternating current source G.

The positive voltage terminals 3*a* of the output side 3 are connected in parallel with each other to a positive voltage branch 9.

The negative voltage terminals 3*b* of the output side 3 are connected in parallel with each other to a negative voltage branch 10.

Furthermore, downstream of the devices 1, a charging stage 11 is preferably operatively arranged downstream of said three devices 1 and connected to said positive 9 and negative 10 voltage branches.

The charging stage 11 preferably comprises a capacitor bank 12.

In particular, the capacitor bank 12 comprises at least two capacitors connected in series and between which a central tap CT is (electrically) interposed.

Preferably, the second terminals 2*b* of the power supply side 2 of the devices 1 are connected to the central tap CT of the capacitor bank 12.

In other words, the neutral N of the source G is connected to the central tap CT of the capacitor bank 12.

Advantageously, in this configuration the two capacitors are always charged concomitantly (see FIG. 8 in this regard), to the full advantage of a significant reduction in the current ripple.

In fact, FIG. 8 shows that during the power supply positive half-wave and with the switch 7 open, both capacitors 12 of the bank are charged simultaneously.

The invention achieves the intended objects and attains important advantages.

In fact, the adoption of power factor correction devices having one inductor on the phase and one inductor, coupled to or decoupled from the first one, on the neutral, allows a decoupling effect which considerably reduces voltage oscillations and the corresponding earth leakage current.

Moreover, by connecting this system to the central tap of the capacitor bank, also the current ripple in the DC-link can be significantly reduced since both capacitors are charged simultaneously during the discharge phase.

The invention claimed is:

1. A power factor correction device comprising:

a power supply side which is connectable to a source of alternating current, the power supply side including at least a first terminal and a second terminal, which are connectable to a phase and to a neutral of said source, respectively;

an output side which is connectable to a direct current load and which includes a positive voltage terminal and a negative voltage terminal;

at least a first power inductor electrically connected in series to said first terminal of the power supply side;

a rectifier operatively interposed between said power supply side and said output side and comprising:

a diode bridge configured to convert the alternating current into a direct current towards the load;

one or more switches which are selectively switchable between an open configuration and a closed configuration to switch the rectifier between a first configuration, in which said rectifier interrupts a current flow towards the output side and charges said first power inductor, and a second configuration, in which said rectifier allows the current flow to the load and discharges said first power inductor;

a second power inductor electrically connected in series to said second terminal of the power supply side;

wherein said first power inductor and said second power inductor are magnetically coupled to each other such that the current flowing in the first power inductor flows in a same direction as a current flowing in the second power inductor.

2. The device according to claim 1, comprising:

two of the first power inductor connected together in series, two of the second power inductor connected together in series, wherein one of said first power inductors and one of said second power inductors are magnetically coupled to each other.

3. The device according to claim 1, wherein the first power inductor and the second power inductor, which are coupled together, are concentrically wound around a same ferromagnetic core.

4. The device according to claim 1, wherein said rectifier has one of the following configurations:

Vienna,

Totem pole.

5. An apparatus for converting a three-phase alternating current into a direct current, comprising:

three devices according to claim 1, wherein the source of alternating current is a source of three-phase alternating current;

wherein the three devices are arranged in parallel, with each having:

the first terminal of the power supply side connected to a respective phase of the three-phases of the source;

the second terminal of the power supply side connected in parallel with the other second terminals and to the neutral of the source;

the positive voltage terminal of the output side connected in parallel with the other positive voltage terminals to form a positive voltage branch;

the negative voltage terminal of the output side connected in parallel with the other negative voltage terminals to form a negative voltage branch.

6. The apparatus according to claim 5, and further comprising a charging stage operatively arranged downstream of said three devices and connected to said positive voltage branch and said negative voltage branch; said charging stage comprising a capacitor bank configured to be charged when said rectifier is in said second configuration.

7. The apparatus according to claim 6, wherein the capacitor bank includes at least two capacitors connected in series and between which a central tap is interposed; said second terminals of the power supply side of the devices being connected to the central tap of the capacitor bank.

* * * * *